(12) United States Patent
Cassidy

(10) Patent No.: US 10,406,871 B1
(45) Date of Patent: Sep. 10, 2019

(54) MULTI-ATTACHMENT TRAILER HITCH WITH ATTACHMENTS MOVABLE BETWEEN WORKING AND STORAGE POSITIONS

(71) Applicant: Sean Cassidy, St. Andrews (CA)

(72) Inventor: Sean Cassidy, St. Andrews (CA)

(73) Assignee: Sean Cassidy, St. Andrews (CA)

( * ) Notice: Subject to any disclaimer, the term of this patent is extended or adjusted under 35 U.S.C. 154(b) by 0 days.

(21) Appl. No.: 16/243,366

(22) Filed: Jan. 9, 2019

(30) Foreign Application Priority Data

Jul. 27, 2018 (CA) ........................... 3012619

(51) Int. Cl.
*B60D 1/07* (2006.01)
*B60D 1/54* (2006.01)
*B60D 1/06* (2006.01)
(52) U.S. Cl.
CPC ............... *B60D 1/07* (2013.01); *B60D 1/06* (2013.01); *B60D 1/54* (2013.01); *B60D 2001/544* (2013.01)
(58) Field of Classification Search
CPC ... B60D 1/07; B60D 1/06; B60D 1/54; B60D 2001/544
See application file for complete search history.

(56) References Cited

U.S. PATENT DOCUMENTS

| | | | |
|---|---|---|---|
| 2,872,213 A | 2/1959 | Hosford | |
| 2,911,233 A | 11/1959 | Riddle | |
| 3,801,134 A * | 4/1974 | Dees | B60D 1/07 280/416.1 |
| 4,022,490 A | 5/1977 | Rocksvold | |
| 4,456,279 A | 6/1984 | Dirck | |
| 4,729,571 A | 3/1988 | Tienstra | |
| 5,044,652 A | 9/1991 | Brisson | |
| 5,106,114 A * | 4/1992 | Haupt | B60D 1/07 280/416.1 |
| 5,322,313 A | 6/1994 | Schroeder | |
| 5,351,982 A | 10/1994 | Walrath | |
| 5,560,630 A | 10/1996 | Phares et al. | |
| 5,857,693 A | 1/1999 | Clark | |

(Continued)

FOREIGN PATENT DOCUMENTS

| | | |
|---|---|---|
| CA | 1216316 | 1/1987 |
| CA | 2279021 | 1/2001 |

*Primary Examiner* — Joseph M Rocca
*Assistant Examiner* — Michael R Stabley
(74) *Attorney, Agent, or Firm* — Kyle R Satterthwaite; Ryan W. Dupuis; Ade & Company Inc.

(57) ABSTRACT

A multi-attachment trailer hitch features a shank for coupling with a receiver tube of a towing vehicle, and first and second hitch attachments of different size or type from one another movably carried on the shank by one or more supports. Each support is movably coupled to the shank for selective swiveling or rotation thereof about an upright axis to move one or more of said hitch attachments between a working position situated rearwardly beyond the rear end of the shank, and a storage position situated more forwardly than the working position. The one or more supports are movable into a full-storage state in which no hitch attachment occupies the working position, thereby eliminating or minimizing a rearward projection of the hitch from the rear of a towing vehicle to reduce or eliminating tripping or rear-end puncture hazards.

20 Claims, 2 Drawing Sheets

(56) References Cited

U.S. PATENT DOCUMENTS

| | | | |
|---|---|---|---|
| 5,915,714 A | 6/1999 | Bell et al. | |
| D415,725 S | 10/1999 | Wyant | |
| 6,116,633 A * | 9/2000 | Pride | B60D 1/07 280/416.1 |
| 6,315,316 B1 | 11/2001 | Wyant | |
| 6,497,428 B2 | 12/2002 | Ross | |
| 6,974,148 B2 * | 12/2005 | Moss | B60D 1/06 280/416.1 |
| 7,004,492 B2 * | 2/2006 | Moss | B60D 1/07 280/456.1 |
| 7,021,643 B1 * | 4/2006 | Buchanan | B60D 1/06 280/416.1 |
| 7,029,022 B2 * | 4/2006 | Moss | B60D 1/06 280/416.1 |
| 7,347,440 B2 | 3/2008 | Shannon | |
| 7,566,067 B1 * | 7/2009 | Alexander | B60D 1/07 280/415.1 |
| 8,366,133 B2 | 2/2013 | Brinkley | |
| 8,408,577 B2 * | 4/2013 | Works | B60D 1/06 280/490.1 |
| 10,099,524 B1 * | 10/2018 | Landry | B60D 1/06 |
| 2011/0133432 A1 * | 6/2011 | Nordick | B60D 1/07 280/504 |

* cited by examiner

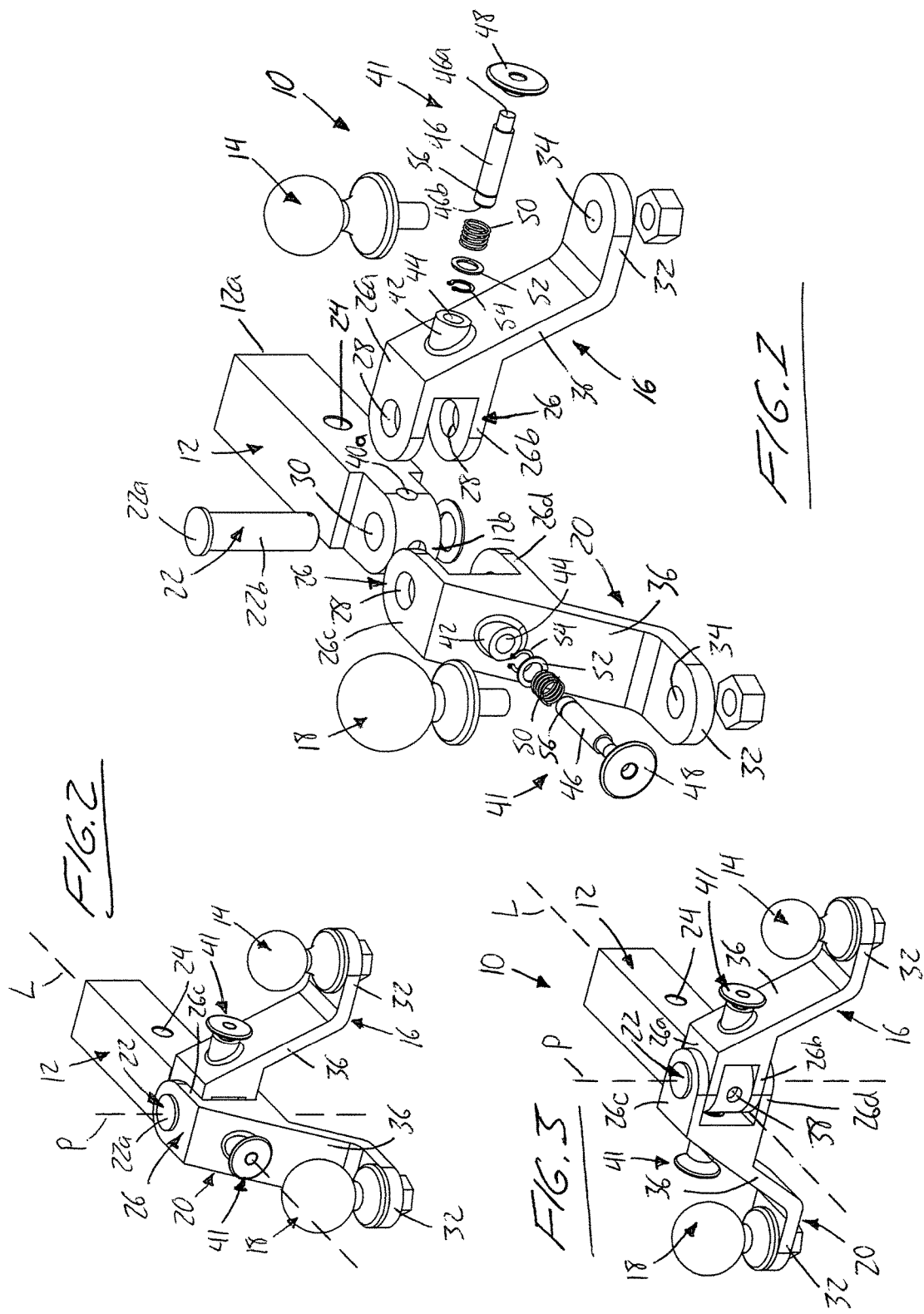

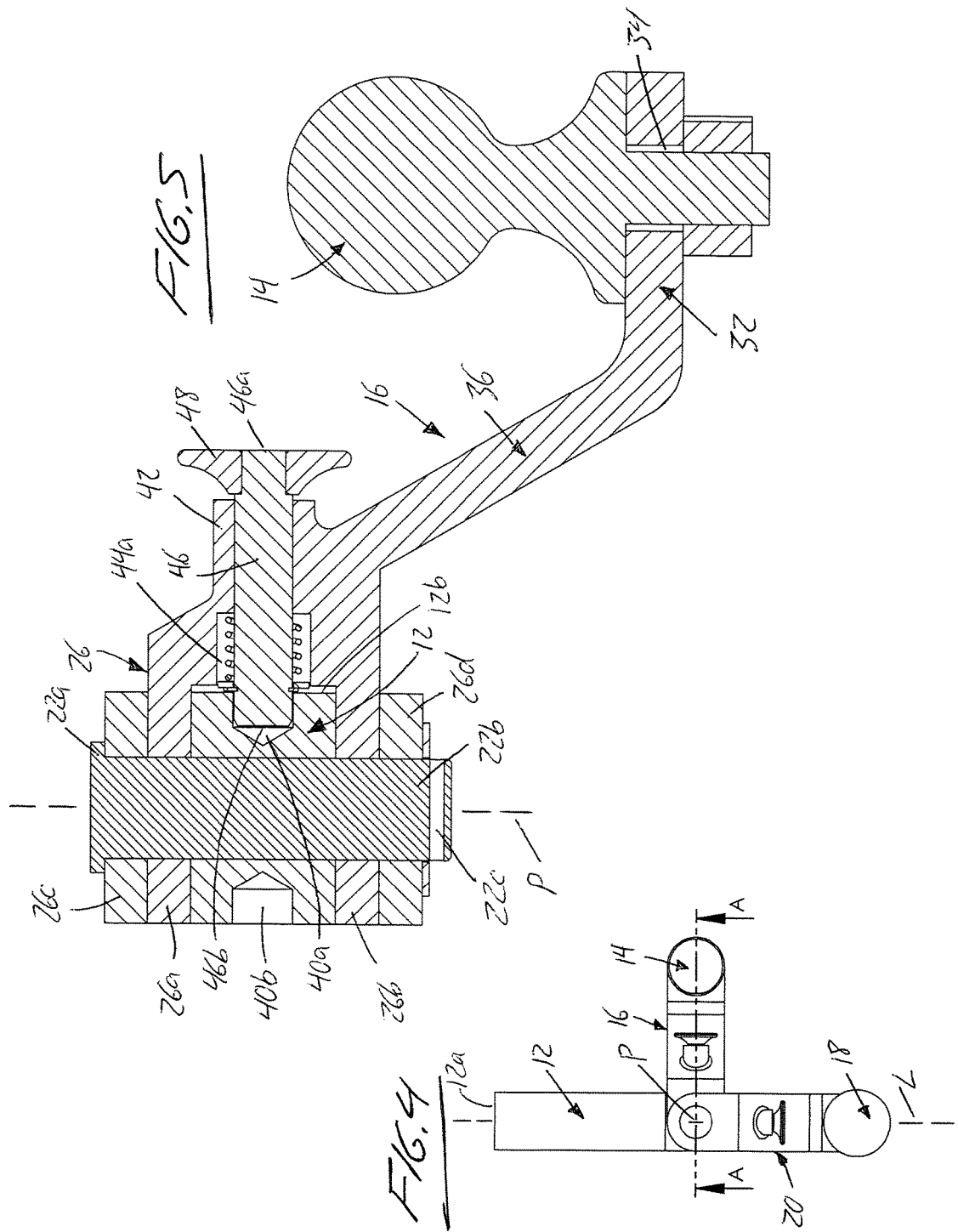

MULTI-ATTACHMENT TRAILER HITCH WITH ATTACHMENTS MOVABLE BETWEEN WORKING AND STORAGE POSITIONS

CROSS-REFERENCE TO RELATED APPLICATIONS

This application claims benefit under 35 U.S.C. 119(a) of Canadian Patent Application No. 3,012,619, filed Jul. 27, 2018, the entirety of which is incorporated herein by reference.

FIELD OF THE INVENTION

The present invention relates generally to trailer hitches, and more particularly to multi-attachment trailer hitches having multiple hitch connectors or accessories of varying size or type.

BACKGROUND

In the prior art, there has been recognized a need for trailer hitches having multiple hitch connectors of varying size or type to enable towing of differently equipped trailers by the same towing vehicle. Prior patent references disclosing multi-connector hitches having multiple hitch balls of varying diameter include Canadian Patent Applications CA1216316 and CA2279021, and U.S. Pat. Nos. 2,872,213, 2,911,233, 4,456,279, 4,729,571, 5,044,652, 5,322,313, 5,351,982, 5,560,630, 5,857,693, 5,915,714, 6,315,316, 6,497,428, 7,347,440, 8,366,133 and USD415725.

However, a majority of the forgoing reference disclose cantilevered support of a bulky multi-ball structure from the rear of the vehicle, which can create a tripping hazard for passers-by or a puncture risk in the event of a rear-end vehicle collision. Omission of such hazards thus requires removal of the multi-ball structure from the vehicle between towing operations, representing a burden for the vehicle operator.

Accordingly, there remains room improvement in multi-connector hitch design, and particularly for a solution that addresses the above shortcoming of the prior art.

SUMMARY OF THE INVENTION

According to a first aspect of the invention, there is provided a trailer hitch comprising:

a shank for coupling with a receiver tube of a towing vehicle, said shank having a front end for insertion to said receiver tube and a rear end situated opposite said front end;

first and second hitch attachments of different size or type from one another and movably carried on the shank by one or more supports;

wherein:

each of the one or more supports is movably coupled to the shank for selective swiveling or rotation thereof about an upright axis to move one or more of said hitch attachments between a working position situated rearwardly beyond the rear end of the shank, and a storage position situated more forwardly than the working position;

said one or more supports are movable into a full-storage state in which no hitch attachment occupies the working position; and the one or more supports comprise first and second supports that are movable independently of one another and that respectively support the first and second hitch attachments.

According to a second aspect of the invention, there is provided a trailer hitch comprising:

a shank for coupling with a receiver tube of a towing vehicle, said shank having a front end for insertion to said receiver tube and a rear end situated opposite said front end;

first and second hitch attachments of different size or type from one another and movably carried on the shank by one or more supports;

wherein:

each of the one or more supports is movably coupled to the shank for selective swiveling or rotation thereof about an upright axis to move one or more of said hitch attachments between a working position situated rearwardly beyond the rear end of the shank, and a storage position situated more forwardly than the working position;

said one or more supports are movable into a full-storage state in which no hitch attachment occupies the working position; and said one or more supports comprises a plurality of supports that are coupled to the shank at different elevations from one another.

According to a third aspect of the invention, there is provided a trailer hitch comprising:

a shank for coupling with a receiver tube of a towing vehicle, said shank having a front end for insertion to said receiver tube and a rear end situated opposite said front end;

first and second hitch attachments of different size or type from one another and movably carried on the shank by one or more supports;

wherein:

each of the one or more supports is movably coupled to the shank for selective swiveling or rotation thereof about an upright axis to move one or more of said hitch attachments between a working position situated rearwardly beyond the rear end of the shank, and a storage position situated more forwardly than the working position;

said one or more supports are movable into a full-storage state in which no hitch attachment occupies the working position; and each of the one or more supports comprises a bifurcated portion by which the support is coupled to the shank at two different elevations.

According to a fourth aspect of the invention, there is provided a trailer hitch comprising a shank for coupling with a receiver tube of a towing vehicle, said shank having a front end for insertion to said receiver tube and a rear end situated opposite said front end;

first and second hitch attachments of different size or type from one another and movably carried on the shank by one or more supports;

wherein:

each of the one or more supports is movably coupled to the shank for selective swiveling or rotation thereof about an upright axis to move one or more of said hitch attachments between a working position situated rearwardly beyond the rear end of the shank, and a storage position situated more forwardly than the working position;

said one or more supports are movable into a full-storage state in which no hitch attachment occupies the working position; and the one or more supports comprise multiple supports each carrying a respective one of the hitch attachments and each having a respective locking device by which said support is selectively lockable in both a deployed position placing said respective one of the hitch attachments in the working position, and a retracted position placing said respective one of the hitch attachments in the storage position.

According to a fifth aspect of the invention, there is provided a trailer hitch comprising:

a shank for coupling with a receiver tube of a towing vehicle, said shank having a front end for insertion to said receiver tube and a rear end situated opposite said front end;

first and second hitch attachments of different size or type from one another and movably carried on the shank by one or more supports;

wherein:

each of the one or more supports is movably coupled to the shank for selective swiveling or, rotation thereof about an upright axis to move one or more of said hitch attachments between a working position situated rearwardly beyond the rear end of the shank, and a storage position situated more forwardly than the working position;

said one or more supports are movable into a full-storage state in which no hitch attachment occupies the working position; and the one or more supports comprise multiple supports each carrying a respective one of the hitch attachments and each having a proximal end thereof near which a shared pivot pin passes through the supports into the shank on said upright axis in order to pivotally couple said supports to the shank for said selective swiveling or rotation about said upright axis.

According to a sixth aspect of the invention, there is provided a trailer hitch comprising: there is provided a multi-attachment trailer hitch comprising:

a shank for coupling with a receiver tube of a towing vehicle, said shank having a front end for insertion to said receiver tube and a rear end situated opposite said front end;

first and second supports movably coupled to the shank for selective swiveling or rotation relative thereto about an upright axis residing at or near proximal ends of said first and second supports; and first and second hitch attachments of different size or type from one another and respectively mounted on the first and second supports at or near distal ends thereof opposite the proximal ends;

each support being swingable about the upright axis between a deployed position reaching rearwardly from the shank to place the respective hitch attachment in a working position situated rearwardly beyond the rear end of the shank, and a retracted position extending less rearwardly to place the respective hitch attachment in a storage position situated more forwardly than the working position;

wherein the supports are swingable relative to one another about the upright axis to vary an angular space between said supports about said upright axis between a first state placing one support in the deployed position and one support in the retracted position, and a second state placing both supports in the retracted position.

BRIEF DESCRIPTION OF THE DRAWINGS

One embodiment of the invention will now be described in conjunction with the accompanying drawings in which:

FIG. 1 is an exploded perspective view of a multi-attachment trailer hitch according to the present invention.

FIG. 2 is an assembled perspective view of the multi-attachment trailer hitch of FIG. 1 in a working state supporting one of its two hitch attachments in a working position, and the other in a storage position.

FIG. 3 is an assembled perspective view of the multi-attachment trailer hitch of FIG. 1 in a storage state supporting both of its two hitch attachment in respective storage positions.

FIG. 4 is an overhead plan view of the multi-attachment trailer hitch of FIG. 2.

FIG. 5 is a cross-sectional view of the multi-attachment trailer hitch of FIG. 4 as viewed along line A-A thereof.

DETAILED DESCRIPTION

FIG. 1 shows an exploded view of a multi-attachment trailer hitch 10 according to one preferred embodiment of the present invention. The hitch 10 features a shank 12, a first hitch connector 14 mounted on a first support 16, a second hitch connector 18 mounted on a second support 20, and a pivot pin 22 pivotally coupling both supports 16, 18 to the shank 12. The shank 12 has a front end 12a and an opposing rear end 12b spaced horizontally therefrom on a longitudinal axis L. In reference planes lying normal to said longitudinal axis L, the shank has a rectangular cross-sectional shape over a majority of its length from the front end 12a thereof toward the opposing rear end 12b. This rectangular cross-section is appropriately sized for selective insertion of the front end 12a of the shank 12 into a conventional hitch receiver of a towing vehicle. A lock pin bore 24 passes transversely through the rectangular portion of the shank 12 in a horizontal direction perpendicular to the longitudinal L at an intermediate location situated part way between the front and rear ends of the shank. Th lock pin bore 24 aligns with a matching lock pin bore of the hitch receiver to enable pinned locking of the shank 12 to the hitch receiver when inserted therein.

In the illustrated embodiment, each hitch connector 14, 18 is a hitch ball of different diameter from the another, thereby denoting two hitch connectors of different size, but it will be appreciated that either hitch connector may be of a type other than a hitch ball (e.g. pintle hitch, D-ring, hook, etc.), and that the two hitch connectors may differ in type from one another. As yet another alternative, one of the hitch connectors may be substituted for a hitch accessory (e.g. hitch step for easier access to a cargo bed, cargo hold, overhead cargo door, roof rack, etc. of a towing vehicle). The term hitch attachment is therefore used herein to encompass both hitch connectors, and hitch accessories of any type whose size and shape wouldn't interfere with the described operation of the hitch, as outlined in more detail herein below.

The pivot pin 22 lies on a vertically upright pivot axis P that perpendicularly intersects the longitudinal axis L near the rear end 12b of the shank 12. The pivot pin 22 provides a pivotal connection of both supports 16, 20 to the shank 12, whereby each support can be swung horizontally about this upright pivot axis P relative to the shank 12. More specifically, each support 16, 20 can be swung through at least a ninety-degree arc about the pivot axis P between a deployed position reaching rearwardly from the rear end 12b of the shank 12 at a vertical mid-plane containing both the longitudinal axis L and the upright pivot axis P, and a retracted position reaching laterally outward from the shank 12 at a vertical cross-plane that perpendicularly intersects the mid-plane at the upright pivot axis P.

In the retracted position, each support 16, 20 and its respective hitch attachment 14, 18 thus reside in more forwardly disposed relation to the shank 12 than in the deployed position of the support. In the illustrated embodiment, no part of the support 16, 20 or its respective hitch attachment 14, 18 protrudes rearwardly beyond the rear end 12b of the shank 12 in the retracted position of the support. On the other hand, in the deployed position, the rearward reach of the support 16, 20 from the shank 12 is at its maximum so as to place the respective hitch attachment 14, 18 as far rearward as possible. In use of the hitch on a tow vehicle, this places the hitch attachment 14, 18 in an accessible position rearward of the tow vehicle's rear bumper. Placement of one support 16, 20 in its retracted position allows the other support to optionally be swung out into its deployed position for use, as shown in FIG. 2. On the other hand, placement of both supports 16, 20 in their retracted positions, as shown in FIG. 3, eliminates or minimizes the rearward reach of the overall hitch 10 from the vehicle's hitch receiver in order or minimize or eliminate the rearward reach of the hitch 10 from the rear bumper of the vehicle. With both supports retracted when use of the hitch is not required, a trip or puncture hazard at the rear of the vehicle is thus avoided.

In the illustrated embodiment, each support 16, 20 is a pedestal arm having a bifurcated upper connection portion 26 with parallel upper and lower forks that reach horizontally over and under the shank 12, respectively. Each fork 26a, 26b, 26c, 26d has a pin aperture 28 that passes vertically therethrough on the pivot axis P and aligns with a matching pin hole 30 passing vertically through the shank 12 on the pivot axis P near the rear end 12b of the shank.

The forks 26a, 26b of the first support 16 have lesser vertical spacing therebetween than the forks 26c, 26d of the second support 20. More specifically the vertical spacing between the forks 26a, 26b of the first support 16 just slightly exceeds the vertical height of the shank 12 at the rear end 12b and pin hole 30 thereof. On the other hand, the vertical spacing between the forks 26c, 26d of the second support 20 slightly exceeds a height measurement of the first support's bifurcated connection portion from the underside of the lower fork 26b thereof to the topside of the upper fork 26a thereof. Accordingly, the upper and lower forks 26a, 26b of the first support 16 reside immediately above and below the shank 12, respectively, while the upper and lower forks 26c, 26d of the second support 20 reside respectively above and below the upper and lower forks 26a, 26b of the first support 16. The bifurcated connection portion of the first support 16 is thus received inside the bifurcated connection portion of the second support 20 between the forks 26c, 26d thereof.

The pivot pin 22 has an upper head 22a that resides above the upper fork 26c of the second support 20, and a lower stem 22b that depends downwardly form the upper head 22a through the pin apertures 28 of all four support forks 26a, 26b, 26c, 26d and the aligned pin hole 30 of the shank. As shown in FIG. 5, the pivot pin 22 preferably includes a cross-bore 22c therein near the bottom end thereof below the lowermost support fork 26d to receive a cotter pin or the like (not shown), to prevent upward withdrawal of the pivot pin 22. Via their bifurcated connection portions 26, the supports 16, 20 are penetrated by the pivot pin 22 at different elevations from one another, whereby the two supports 16, 20 are pivotally connected to the shank 12 at different elevations relative thereto. When either support is swung into its retracted position, it doesn't interfere with movement of the other support between its deployed and retracted positions.

At a distance further radially outward from the pivot axis P than the bifurcated connection portion 26, each support features a planar mounting portion 32 that resides in a horizontal plane at a lower elevation than both forks of the bifurcated connection portion 26. The connection and mounting portions 26, 32 of each support define opposing proximal and distal ends thereof, adjacent which the pivot pin 22 and respective hitch attachment reside. A mounting hole 34 passes vertically through the mounting portion 32 of each support 16, 20 near the distal end thereof to accommodate bolted mounting of the respective hitch attachment 14, 18 thereto through said mounting hole. The mounting portion 32 thus defines a support pedestal on which the respective hitch attachment 14, 18 is carried at an elevation spaced below the underside of the shank 12 at a radial distance outward therefrom. An offset portion 36 of each support 16, 20 lies intermediately of the proximal and distal ends thereof and angles obliquely downward and radially outward from the bifurcated upper connection portion 26 in order interconnect the connection and mounting portions 26, 32 at an inclined angle therebetween.

The rear end 12b of the shank is defined by an apex of a semi-cylindrical end wall of the shank 12 that spans arcuately around the pivot axis P and is bisected by the vertical mid-plane at said apex. Here, the rear end 12b of the shank is penetrated by a deployed-position lock-hole 38 opening into the shank 12 on the longitudinal axis thereof. At ninety degrees around the semi-cylindrical end wall from this deployed-position lock-hole 38, a first retracted-position lock-hole 40a penetrates one side of the shank 12 in the transverse direction perpendicular to the longitudinal axis L. At 90-degrees around the semi-cylindrical end wall from the deployed-position lock-hole 38 and 180-degrees around the semi-cylindrical end wall from the first retracted-position lock-hole 40a, a second retracted-position lock-hole 40b penetrates the other side of the shank 12 in the transverse direction. The axes of the two retracted-position lock-holes are coincident with one another, and perpendicularly intersect the longitudinal axis L on which the deployed-position lock-hole 38 resides.

Each support 16, 20 features a respective lock pin assembly 41 mounted thereon at the offset portion 36 thereof, where a lock pin barrel 42 has a lock pin bore 44 horizontally penetrating the offset portion 36 at an oblique angle thereto on a lock pin axis that perpendicularly intersects the pivot axis P in the same horizontal plane as the lock holes 38, 40a, 40b of the shank 12. A lock pin 46 has an outer end 46a disposed outside the lock pin bore 44 at the outer side of the support's oblique portion 36 that faces away from the shank 12, where a pull knob 48 is affixed to this outer end of the lock pin 46. The lock pin bore 44 penetrates through the opposing inner side of the oblique portion 36 of the support into the space between the forks of the bifurcated connection portion 26 thereof. Here, the lock pin bore 44 is counter-bored to create an enlarged area 44a of the bore 44 in which a compression spring 50 is coiled around the lock pin 46. An outer end of the spring 50 abuts against an annular stop shoulder where the bore 44 diameter steps down from the enlarged area 44a. An opposing inner end of the spring 50 abuts against a retaining washer 52 that is disposed around the lock pin 46 at a distance from said stop shoulder. A circlip 54 is engaged in a circumferential groove 56 of the lock pin 46 on a side of the retaining washer 52 opposite the spring 50. The circlip 54 prevents the washer 52 and spring 50 from sliding off the inner end of the lock pin 46 when the lock pin assembly 41 is first installed, but before the supports 16, 20 are pinned to the shank 12.

The spring 50 biases the lock pin 46 into a locking position jutting sufficiently far into the inter-fork space of the bifurcated connection portion 26 of the support that that the inner end of the lock pin 46 will automatically engage into the deployed-position lock-hole 38 under swinging of the support into the deployed position on the shank, and likewise automatically engage into the retracted-position lock-hole 40a, 40b on a respective side of the shank 12 when the support is swung into its retracted position. Accordingly, each support is self-locking in both the deployed position and the retracted position thereof. To release the support from either such position, the pull knob 48 on the outer end the respective lock pin 46 is pulled outwardly away from the shank 12 against the bias force of the compression spring 50, thus withdrawing the inner end of the lock pin 46 from the given lock pin hole 38, 40a, 40b to enable swinging of the support into its other position.

FIG. 2 shows the first support 16 in its retracted position reaching laterally out to a first side of the shank 12, while the second support 20 is in the deployed position reaching longitudinally rearward from the shank 12 to place the second hitch connector 18 rearwardly of the tow vehicle's rear bumper to enable connection of a trailer thereto. This is one of two possible working states in which one of the two hitch attachments is in a working position situated rearwardly of the shank 12 and the vehicle bumper in an accessible position for use. Swinging the second support 20 90-degrees around the pivot axis P out of the deployed position in a direction away from the first support 16, once enabled by pulling of the respective lock pin 46 via its pull knob 48, moves the second support 20 into its retracted position, as shown in FIG. 3. The hitch is now in a fully-retracted full-storage state where both supports 16, 20 are withdrawn into their laterally reaching retracted positions residing at 180-degrees to one another on opposite sides of the shank 12. In this state, neither support reaches rearwardly from the shank, and thus has zero or minimal rearward protrusion past the rear bumper of the vehicle so as to eliminate or minimize a trip or puncture hazard. Both hitch attachments 14, 18 are thus safely stowed, and automatically locked, in their storage positions below the tow vehicle, or at least in close proximity to the rear bumper thereof. To deploy the first support 16, its respective lock pin 46 is released by pulling of its respective knob 48, and the first support 16 is swung about the pivot axis P by 90-degrees out of its retracted position toward the already-retracted second support. The hitch 10 is thus operable between a fully-retracted full-storage state and two different deployment states, in each of which a respective one of the two hitch attachments 14, 18 is deployed, while the other is stored.

While the illustrated embodiment employs two supports each carrying a respective hitch attachment, an alternate embodiment may employ a single support that reaches outwardly from both sides of the shank in a retracted position to likewise carry the two hitch attachments in storage positions on opposite sides of the shank in the fully-retracted full-storage state of the hitch. In such an embodiment, the two hitch attachments would reside at a fixed angular spacing from one another around the pivot axis, and both hitch attachments would reside at the midplane when one is deployed rearwardly of the hitch, in which instance the other attachment resides diametrically opposite the first attachment across the pivot axis at a location below the hitch receiver. Such embodiments would require that the mounting portions of the shared support are at low enough elevation that both hitch attachments clear the underside of the shank and hitch receiver, and would also require a different locking mechanism. On such locking mechanism could employ two locking pins on opposite sides of the pivot axis at an underside of the support, each being spring-biased upwardly into engagement with a lock pin hole in the underside of the shank at a location forwardly of the pivot pin hole 30. In another embodiment, instead of two supports independently swingable relative to one another about the pivot axis defined by a shared pivot pin, two supports having respective pivotal connections to the shank may be employed. However, the reduced bill of materials for a shared pivot configuration like that of the illustrated embodiment is likely preferable.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A trailer hitch comprising:
   a shank for coupling with a receiver tube of a towing vehicle, said shank having a front end for insertion to said receiver tube and a rear end situated opposite said front end;
   first and second hitch attachments of different size or type from one another and movably carried on the shank by one or more supports;
   wherein:
      each of the one or more supports is movably coupled to the shank for selective swiveling or rotation thereof about an upright axis to move one or more of said hitch attachments between a working position situated rearwardly beyond the rear end of the shank, and a storage position situated more forwardly than the working position;
      said one or more supports are movable into a full-storage state in which no hitch attachment occupies the working position; and
      the one or more supports comprise first and second supports that are movable independently of one another and that respectively support the first and second hitch attachments.

2. The trailer hitch of claim 1 wherein the one or more supports are supported for said selective swiveling or rotation about the same upright axis as one another.

3. A trailer hitch comprising:
   a shank for coupling with a receiver tube of a towing vehicle, said shank having a front end for insertion to said receiver tube and a rear end situated opposite said front end;
   first and second hitch attachments of different size or type from one another and movably carried on the shank by one or more supports;
   wherein:
      each of the one or more supports is movably coupled to the shank for selective swiveling or rotation thereof about an upright axis to move one or more of said hitch attachments between a working position situated rearwardly beyond the rear end of the shank, and a storage position situated more forwardly than the working position;
      said one or more supports are movable into a full-storage state in which no hitch attachment occupies the working position; and said one or more supports comprises a plurality of supports that are coupled to the shank at different elevations from one another.

4. The trailer hitch of claim 3 wherein the one or more supports are supported for said selective swiveling or rotation about the same upright axis as one another.

5. A trailer hitch comprising:
a shank for coupling with a receiver tube of a towing vehicle, said shank having a front end for insertion to said receiver tube and a rear end situated opposite said front end;
first and second hitch attachments of different size or type from one another and movably carried on the shank by respective first and second supports;
wherein:
each of said first and second supports is movably coupled to the shank for selective swiveling or rotation thereof about an upright axis to move one or more of said hitch attachments between a working position situated rearwardly beyond the rear end of the shank, and a storage position situated more forwardly than the working position;
said first and second supports are movable into a full-storage state in which no hitch attachment occupies the working position; and
each of the first and second supports comprises a bifurcated portion by which the support is coupled to the shank at two different elevations.

6. The trailer hitch of claim 5 wherein the first and second supports are supported for said selective swiveling or rotation about the same upright axis as one another.

7. The hitch of claim 5 wherein at least one fork of the bifurcated portion of the first bifurcated support is received between two forks of the bifurcated portion of the second support.

8. The hitch of claim 7 wherein both forks of the bifurcated portion of the first support are received between the two forks of the bifurcated portion of the second support.

9. The hitch of claim 5 wherein the bifurcated portion of at least one of said first and second supports is coupled to the shank both thereabove and therebelow.

10. The hitch of claim 5 wherein the bifurcated portion of each of said first and second supports is coupled to the shank both thereabove and therebelow.

11. A trailer hitch comprising:
a shank for coupling with a receiver tube of a towing vehicle, said shank having a front end for insertion to said receiver tube and a rear end situated opposite said front end;
first and second hitch attachments of different size or type from one another and movably carried on the shank by one or more supports;
wherein:
each of the one or more supports is movably coupled to the shank for selective swiveling or rotation thereof about an upright axis to move one or more of said hitch attachments between a working position situated rearwardly beyond the rear end of the shank, and a storage position situated more forwardly than the working position;
said one or more supports are movable into a full-storage state in which no hitch attachment occupies the working position; and
the one or more supports comprise multiple supports each carrying a respective one of the hitch attachments and each having a respective locking device by which said support is selectively lockable in both a deployed position placing said respective one of the hitch attachments in the working position, and a retracted position placing said respective one of the hitch attachments in the storage position.

12. The trailer hitch of claim 11 wherein the one or more supports are supported for said selective swiveling or rotation about the same upright axis as one another.

13. The hitch of claim 11 wherein the respective locking device for each support is affixed thereto.

14. The hitch of claim 11 wherein the respective locking device for each support comprises a spring-loaded locking pin.

15. The hitch claim 11 wherein each support comprises a pedestal arm having a proximal end thereof coupled to the shank at a first elevation, an opposing distal end adjacent which the respective one of the hitch attachments is mounted at a lower second elevation spaced below the shank, and an offset portion disposed between the proximal and distal ends and angling downwardly away from the proximal end toward the distal end, wherein the respective locking device is mounted to said offset portion of the pedestal arm.

16. The hitch of claim 11 wherein a pivot pin resides on said upright axis and passes through the multiple supports and at least partially through the shank at a location adjacent the proximal ends of the supports in order to pivotally couple said supports to the shank for said selective swiveling or rotation about said upright axis.

17. A trailer hitch comprising:
a shank for coupling with a receiver tube of a towing vehicle, said shank having a front end for insertion to said receiver tube and a rear end situated opposite said front end;
first and second hitch attachments of different size or type from one another and movably carried on the shank by one or more supports;
wherein:
each of the one or more supports is movably coupled to the shank for selective swiveling or rotation thereof about an upright axis to move one or more of said hitch attachments between a working position situated rearwardly beyond the rear end of the shank, and a storage position situated more forwardly than the working position;
said one or more supports are movable into a full-storage state in which no hitch attachment occupies the working position; and
the one or more supports comprise multiple supports each carrying a respective one of the hitch attachments and each having a proximal end thereof near which a shared pivot pin passes through the supports into the shank on said upright axis in order to pivotally couple said supports to the shank for said selective swiveling or rotation about said upright axis.

18. A trailer hitch comprising:
a shank for coupling with a receiver tube of a towing vehicle, said shank having a front end for insertion to said receiver tube and a rear end situated opposite said front end;
first and second supports movably coupled to the shank for selective swiveling or rotation relative thereto about an upright axis residing at or near proximal ends of said first and second supports; and
first and second hitch attachments of different size or type from one another and respectively mounted on the first and second supports at or near distal ends thereof opposite the proximal ends;

each support being swingable about the upright axis between a deployed position reaching rearwardly from the shank to place the respective hitch attachment in a working position situated rearwardly beyond the rear end of the shank, and a retracted position extending less rearwardly to place the respective hitch attachment in a storage position situated more forwardly than the working position;

wherein the supports are swingable relative to one another about the upright axis to vary an angular space between said supports about said upright axis between a first state placing one support in the deployed position and one support in the retracted position, and a second state placing both supports in the retracted position.

19. The hitch of claim 18 wherein said supports are coupled to the shank at different elevations from one another.

20. The hitch of claim 18 wherein each of the supports comprises a bifurcated portion by which the support is coupled to the shank at two different elevations.

* * * * *